(12) United States Patent
Lin

(10) Patent No.: US 8,258,846 B2
(45) Date of Patent: Sep. 4, 2012

(54) METHOD AND APPARATUS FOR REGENERATING SAMPLING FREQUENCY AND THEN QUICKLY LOCKING SIGNALS ACCORDINGLY

(75) Inventor: Tzuo-Bo Lin, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 197 days.

(21) Appl. No.: 12/876,923

(22) Filed: Sep. 7, 2010

(65) Prior Publication Data
US 2012/0056649 A1    Mar. 8, 2012

(30) Foreign Application Priority Data
Sep. 7, 2010   (TW) ................................ 98130001 A

(51) Int. Cl.
*H03K 3/00* (2006.01)
(52) U.S. Cl. .......................... 327/299; 327/298; 327/113

(58) Field of Classification Search .......... 327/113–119, 327/291, 298–299
See application file for complete search history.

(56) References Cited

U.S. PATENT DOCUMENTS
6,259,291 B1 *   7/2001   Huang ........................ 327/160
* cited by examiner

*Primary Examiner* — An Luu
(74) *Attorney, Agent, or Firm* — Morris Manning & Martin LLP; Tim Tingkang Xia, Esq.

(57) ABSTRACT

A receiving method and apparatus is disclosed. The method comprising steps of: receiving a plurality of data according to a symbol clock signal, and reading out the plurality of data according to a first clock signal and generating a water level; receiving a second clock signal so as to generate a third clock signal, and adjusting the speed of the third clock signal according to the water level; determining a sampling frequency of the plurality of data according to a data amount of the plurality of data during a unit time period or parameters of the plurality of data; and dividing the third clock signal by a dividing value or multiplying the third clock signal by a multiplying value so as to obtain the first clock signal and adjust the water level by a clock generator.

29 Claims, 8 Drawing Sheets

| Table 2a Audio signal at 32 kHz | | | |
|---|---|---|---|
| Symbol clock signal(MHz) | 32kHZ | | |
| | N | CTS | |
| 25.2/1.001 25.2 | 4576 4096 | 28125 28200 | |
| 27 27*1.001 | 4576 4096 | 28125 28200 | |
| 54 54*1.001 | 4576 4096 | 28125 28200 | |
| 74.25/1.001 74.25 | 4576 4096 | 28125 28200 | |
| 148.5/1.001 148.5 | 4576 4096 | 28125 28200 | |
| Others | 4096 | TBD | |

FIG. 2A
(PRIOR Art)

Table 2b Audio signal at 44.1 kHz

| Symbol clock signal(MHz) | 44.1kHZ N | 44.1kHZ CTS | 88.2kHz N | 88.2kHz CTS | 176.4kHZ N | 176.4kHZ CTS |
|---|---|---|---|---|---|---|
| 25.2/1.001 25.2 | 7000 6272 | 31250 28000 | 14014 12544 | 31250 28000 | 28028 25088 | 31250 28000 |
| 27 27*1.001 | 6272 6272 | 30000 30030 | 12544 12544 | 30000 30030 | 25088 25088 | 30000 30030 |
| 54 54*1.001 | 6272 6272 | 60000 60060 | 12544 12544 | 60000 60060 | 25088 25088 | 60000 60060 |
| 74.25/1.001 74.25 | 17836 6272 | 140625 82500 | 35672 12544 | 234375 82500 | 71344 25088 | 234375 82500 |
| 148.5/1.001 148.5 | 8918 6272 | 234375 165000 | 17836 12544 | 234375 165000 | 35672 25088 | 234375 165000 |
| Others | 6272 | TBD | 12544 | TBD | 25088 | TBD |

FIG. 2B
(PRIOR Art)

Table 2c Audio Signal at 48kHz

| Symbol clock signal (MHz) | 48kHZ N | 48kHZ CTS | 96kHZ N | 96kHZ CTS | 192kHZ N | 192kHZ CTS |
|---|---|---|---|---|---|---|
| 25.2/1.001 | 6864 | 28125 | 13728 | 28125 | 27456 | 28125 |
| 25.2 | 6144 | 25200 | 12288 | 25200 | 24576 | 25200 |
| 27 | 6144 | 27000 | 12288 | 27000 | 24576 | 27000 |
| 27*1.001 | 6144 | 27027 | 12288 | 27027 | 24576 | 27027 |
| 54 | 6144 | 54000 | 12288 | 54000 | 24576 | 54000 |
| 54*1.001 | 6144 | 54054 | 12288 | 54054 | 24576 | 54054 |
| 74.25/1.001 | 11648 | 140625 | 23296 | 140625 | 46592 | 140625 |
| 74.25 | 6144 | 74250 | 12288 | 74250 | 24576 | 74250 |
| 148.5/1.001 | 5824 | 140625 | 11648 | 140625 | 23296 | 140625 |
| 148.5 | 6144 | 148500 | 12288 | 148500 | 24576 | 148500 |
| Others | 6144 | TBD | 12288 | TBD | 24576 | TBD |

FIG. 2C
(PRIOR Art)

Audio packet configuration

| Layout | Max bands | Max sampling | sub-packet 0 | sub-packet 1 | sub-packet 2 | sub-packet 3 |
|---|---|---|---|---|---|---|
| 0 | 2 | 4 | Channel 1, 2 sample 0 | Channel 1, 2 sample 1 | Channel 1, 2 sample 2 | Channel 1, 2 sample 3 |
| 1 | 8 | 1 | Channel 1, 2 sample 0 | Channel 3, 4 sample 0 | Channel 5, 6 sample 0 | Channel 7, 8 sample 0 |

FIG. 3

Effective configuration for Layout 0

| SP0 | SP1 | SP02 | SP3 | Description |
|---|---|---|---|---|
| 0 | 0 | 0 | 0 | No audio sample in sub-packet |
| 1 | 0 | 0 | 0 | Only sub-packet 0 has audio sample |
| 1 | 1 | 0 | 0 | Only sub-packet 0 and 1 have audio sample |
| 1 | 1 | 1 | 0 | Only sub-packet 0, 1, and 2 have audio sample |
| 1 | 1 | 1 | 1 | Only sub-packet 0, 1, 2, 3 all have audio sample |

FIG. 4

METHOD AND APPARATUS FOR REGENERATING SAMPLING FREQUENCY AND THEN QUICKLY LOCKING SIGNALS ACCORDINGLY

BACKGROUND OF THE INVENTION

1. Field of the Invention

The present invention relates to a method and an apparatus for regenerating a sampling frequency and then quickly locking signals accordingly, more particularly to, a method and apparatus for regenerating a sampling frequency and then quickly locking signals in a digital multimedia system.

2. Description of the Prior Arts

For reducing distortion and avoiding letting signal lines twisting in home, it is inevitable for home video/audio electric appliances to adopt digital audio technology systems. In the conventional art, optical fibers are used for digital signal transmission, where its drawback is its high cost. But audio and video are integrated into the same interface in the digital multimedia system, hence the conventional AV terminals are mostly replaced and thus a high quality performance is provided.

It is very complicated to discuss the transmission of the digital audio in the technology domain. First of all, there are so many complicated details troubling the engineers, such as the number of audio channels, data formats, sampling frequencies, compressed or not, and one bit audio. Second, in the digital multimedia system such as HDMI is transmitted by packets, thus the engineers must have knowledge regarding transmission mechanism. Further, in the film, there must be no error in the synchronization between audio and video.

Audio information carried on the linking of the digital multimedia system such as HDMI, can merely rely on TMDS, that is, the video clock. In other words, there will not contain or reserve the sampling frequency of original audio during data transmission. Hence, the sink side must regenerate the sampling frequency, and such kind of action is called "Audio Clock Regeneration". This concept is well applicable in any I/O standards such as USB, DisplayPort, IEEE 1394 and so on. The critical point is which methodology is adopted for achieving the regeneration.

Referring to FIG. 1, which provides a possible embodiment, a receiving apparatus 10 for locking signals, which comprises a first dividing means 101, a second dividing means 102, and a phase-locking loop 103.

In most of the digital multimedia systems, in the source of the audio, the clocks of its audio and video are generated by a common clock source, and this configuration is called "Coherent Clocks." In such a situation, there exists a numerical relationship between them, that is to say; between the clocks they can be divided by one another without remainder. The essential concept of the aforesaid system is that the source apparatus of the audio must calculate the fractional number between the video clock and the audio clock.

To give an example as HDMI, as shown in FIG. 1, the video clock and the audio clock exhibits a mathematical relationship as follows: $128*fs = f_{TMDS\_CLOCK}*N/CTS$ (In DisplayPort, the equation will be write as $512*fs = f_{TMDS\_CLOCK}*M_{aud}/N_{aud}$). Apparently, the source apparatus of the audio have to decide the N at numerator side and the Cycle Time Stamp (CTS) at denominator side, the value of N/CTS (or $M_{aud}/N_{aud}$) is transmitted by data from the source side for providing the parameters for the first dividing means 101 and the second dividing means 102. In case that the video and audio signals are synchronized to each other, then CTS can be treated as fixed. If not synchronized, means that signal jitters are exist, hence CTS may change. FIG. 1 illustrates that the corresponding parameters N and CTS are transmitted via Audio Clock Regeneration packets to the sink side, and the video clock is carried via the TMDS Clock Channel.

The above mentioned conventional art has drawback at least as follows:

(1) The corresponding parameters N and CTS are transmitted via Audio Clock Regeneration packets to the sink side, hence, the phase-locking loop 103 can not start the locking procedure until the Audio Clock Regeneration packets arrived and all the parameters of the packet are deciphered, which leads to the slower response time.

(2) When the Audio Clock Regeneration packets deliver an incorrect value of N or CTS, incorrect sampling frequency will be determined. Therefore, a processor will mistakenly set up the parameters of corresponding circuit, such as the phase-locking loop 103 and hence send out the incorrect audio signals.

(3) While changing the audio sampling frequency, there will be a period of unresponsive time leads to send out the incorrect voice. In other words, if the audio clocks and video clocks are not synchronization, means that signal jitters are exist, hence CTS may change.

(4) The suggestion values of N and CTS are relatively large, as the table 2a~2c shown in FIG. 2A~2C, there are specified audio sampling frequencys such as 32/44.1/48 kHz, which are the most popular frequencys and their corresponding suggestion values for N and CTS. The large value makes the dividing means 101 and 102 cooperated with the locking loop 103 complicated and thus hard to be designed.

(5) The source apparatus have to determine the N at numerator side and the CTS at denominator side, thus the complexity for the source apparatus is increase.

(6) The parameter adjustment for the phase-locking loop 103 must be proceed by the processor, and correspondingly the processor inevitably needs external drivers, hence increase the design complexity and manufacturing cost.

In DisplayPort standard, $M_{aud}$ and $N_{aud}$ are respectively corresponding to N and CTS, since there exist the same issues, redundant information will be thus omitted.

Accordingly, in view of the above drawbacks, it is an imperative that an apparatus and method are designed so as to solve the drawbacks as the foregoing.

SUMMARY OF THE INVENTION

In view of the disadvantages of prior art, the primary object of the present invention is to provide an apparatus and method in ASIC/hardware for quickly regenerating a sampling frequency and quickly locking signals accordingly in a digital multimedia system.

Another object of the present invention also is to provide an apparatus and method for avoiding incorrect audio signals and meanwhile quickly locking signals while changing audio sampling frequency in the digital multimedia system.

According to yet another aspect of the present invention, one skilled in the art can also provide an apparatus and method for simplifying the dividing means cooperating with the phase locking loop and correspondingly reduce the dividing values (namely, reducing the parameters of N/CTS and $M_{aud}$ and $N_{aud}$).

According to yet another aspect of the present invention, one skilled in the art can also provide an apparatus and method for correctly and quickly regenerating sampling frequency and quickly locking audio signals accordingly while in the digital multimedia system while devoid of Audio Clock Regeneration packets or mistakes to the packets or parameters in the packets.

According to yet another aspect of the present invention, one skilled in the art can also quickly and correctly provide the synchronization between the video clocks and the audio clocks.

Hence, the present invention relates to an apparatus for receiving a signal, comprises: a buffering unit, receiving a plurality of data according to a symbol clock signal, reading out the plurality of data according to a first clock signal and generating a water level, wherein the water level is a data amount temporarily stored in the buffering unit; a clock generating unit, receiving a control signal and a second clock signal to generate a third clock signal; a judging unit, receiving the water level and generating the control signal according to the water level, so as to control a generating speed of the third sampling clock signal of the clock generating unit; a frequency detector, determining a sampling frequency of the plurality of data according to a data amount of the plurality of data during a unit time period or parameter values of the plurality of data; and a clock generator, dividing the third clock signal by a dividing value or multiplying the third clock signal by a multiplying value, so as to obtain the first clock signal and to influence the water level.

The present invention further relates to a method for receiving a clock signal, comprises: receiving a plurality of data according to a symbol clock signal by a buffering unit, and reading out the plurality of data according to a first clock signal and generating a water level; receiving a second clock signal so as to generate a third clock signal and regulating a speed of the third clock signal according to the water level; determining a sampling frequency of the plurality of data according to a data amount of the plurality of data during a unit time period or parameter values of the plurality of data; and determining a specific value according to the sampling frequency, and dividing the third clock signal or multiplying the third clock signal by the specific value so as to obtain the first clock signal so as to influence the water level..

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become readily understood from the detailed description given herein below and the accompanying drawings which are given by way of illustration only, and thus are not limitative of the present invention and wherein:

FIG. 2A~2C relates to the parameters of the audio sampling frequency according to the prior art;

FIG. 3 relates to the sub-packet configuration of HDMI according to the present invention;

FIG. 4 relates to the effective sub-packet configuration of the HDMI according to the present invention;

DESCRIPTION OF THE EXEMPLARY EMBODIMENTS

Figure 1:
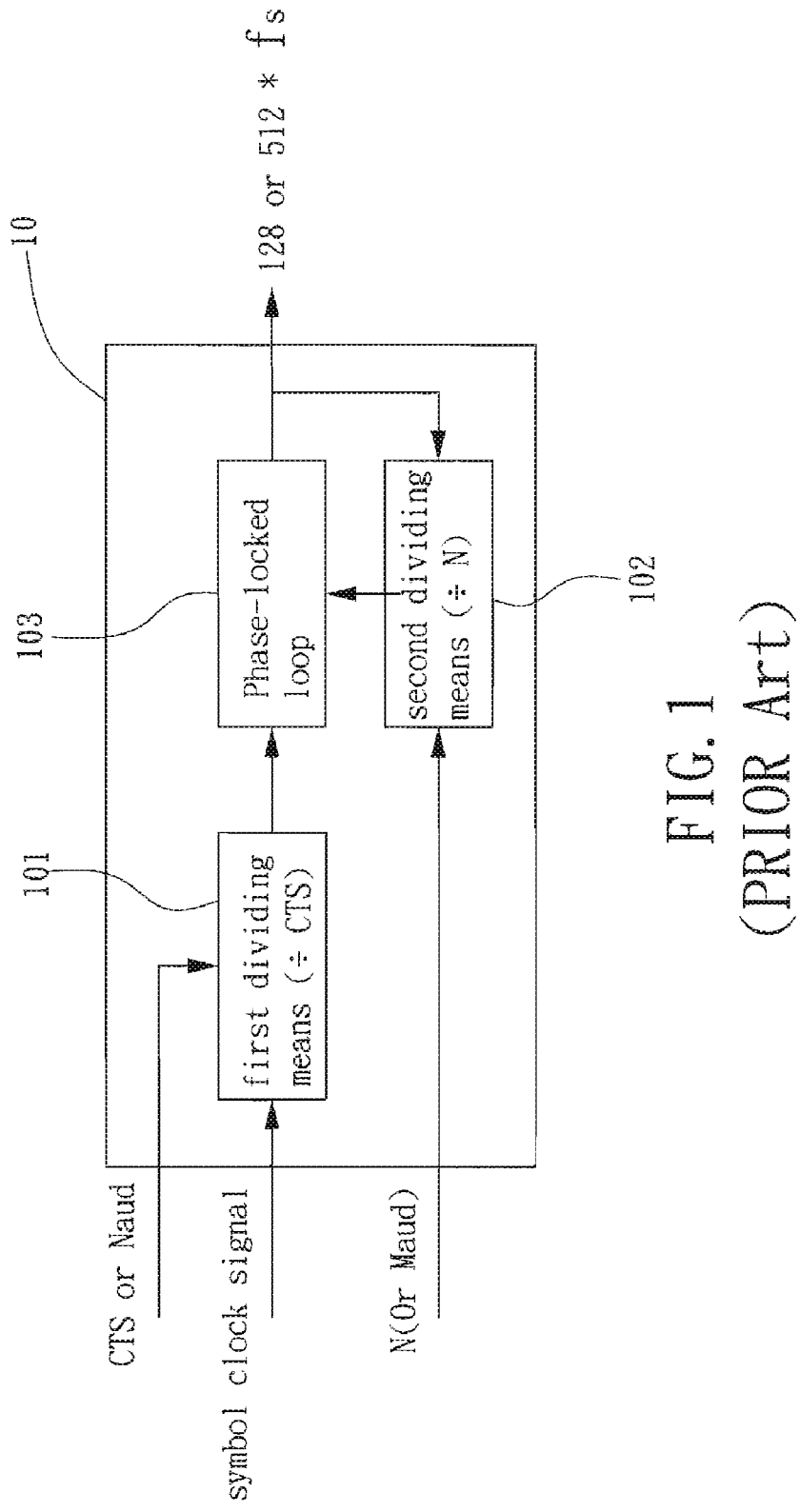
FIG. 1 relates to the frequency regeneration and signal locking according to the prior art.

The following descriptions are of exemplary embodiments only, and are not intended to limit the scope, applicability, or configuration of the invention in any way. Rather, the following description provides a convenient illustration for implementing exemplary embodiments of the invention. Various changes to the described embodiments may be made in the function and arrangement of the elements described. For your esteemed members of reviewing committee to further understand and recognize the fulfilled functions and structural characteristics of the invention, several exemplary embodiments cooperating with detailed description are presented as the follows.

The digital music in the digital multimedia system is inevitably faced to the issue of "sampling frequency". According to the general multimedia system specifications, exemplarily, the source at HDMI/DisplayPort, allows the compressed audio data which may have the sampling frequencies of 32 kHz, 44.1 kHz, 48 kHz, 88.2 kHz, 96 kHz, 176.4 kHz, or 192 kHz. Audio signals and other signals, such as video data, are usually transmitted together, however, the audio packets of the digital multimedia are disposed at blanking areas, (this is because that in HDMI/DisplayPort or USB/1394, the speed for the video signals outnumbers the audio signals by more than ten or hundred times) and are disposed regularly, which means the audio signal variation per unit time should be as small as possible. Meanwhile, as the sampling frequency increases, the disposed audio packets per unit time will increase accordingly. That is to say, at the sink side, the number of the audio packets per unit time can be used to regenerate the sampling frequency of the audio packet.

Take HDMI as an example, as long as the effective sampling number N in per unit time period T be calculated, in other words, if the numbers of the packets with the header as shown in FIG. 3 is calculated, (the meaning of "effective" will be further defined later), the audio sampling frequency can be obtained by N is divided into T, and have no need to use the aforesaid N/CTS information.

The HDMI specification defines two types of sub-packets configuration as Layout=0 and Layout=1, (As illustrated in FIG. 3). In the headers of audio sampling packets, there are four "sample_present" bits, each of the sample_present bits corresponds to the sub-packets to present whether the sub-packets comprises audio sampling or not. The configuration of Layout 0 allows the string audio of dual band of single IEC 61937 or IEC 60958 carried at most four samples. The four sampling_present bits comprises only five effective configurations. Suppose that the effective value of the $M^{th}$ packet of N samples is calculated, when the Layout value in the header of said $M^{th}$ packet is 0, which presents that the $M^{th}$ packet is dual band and carries 1~4 samples, as illustrated in FIG. 4, by calculating the 1~4 samples of the sample_present, the number of 1 in the samples is obtained and is defined as the sampling value of the audio packet. For example, if the sample_present.sp0/1/2/3 is 0000, then the sampling value is 0, if it is 1000, then the sampling value is 1, and if it is 1110, then the sampling value is 3 . . . so on and so forth.

If the Layout value of the $M^{th}$ packet is 1, it represents that the packet is of 3~8 bands, thus only carried 0 or 1 sample, at this time, the only thing need to be checked is the sample_present.sp0 is 0 or 1.

In short, in regard to the M audio packets during a unit time period T, each Layout value and its corresponding sample_present.sp0~3 can be used to derive the effective value of each corresponding packet. The effective values are summing up and then divided by the unit time period T so as to obtain the sampling frequency. In the DisplayPort specification, the $7^{th}$ bit in the $3^{rd}$ byte of the four-byte payload in the packet is also sample_present like where the effective value is similar to that in the HDMI, thus duplicate information will be omitted accordingly.

One embodiments of the present invention exhibits that since the sampling frequencies of the audio packets in the digital multimedia system are specified nothing but 32 kHz, 44.1 kHz, 48 kHz, 88.2 kHz, 96 kHz, 176.4 kHz, or 192 kHz, the person skilled in the art can surely selecting and comparing from the audio sampling frequency, the 32 kHz, 44.1 kHz, 48 kHz, 88.2 kHz, 96 kHz, 176.4 kHz, or 192 kHz. For example, if the aforesaid N divided by T is 49.1 kHz, then the sampling frequency should be the closer frequency such as 48 kHz.

Figure 5:
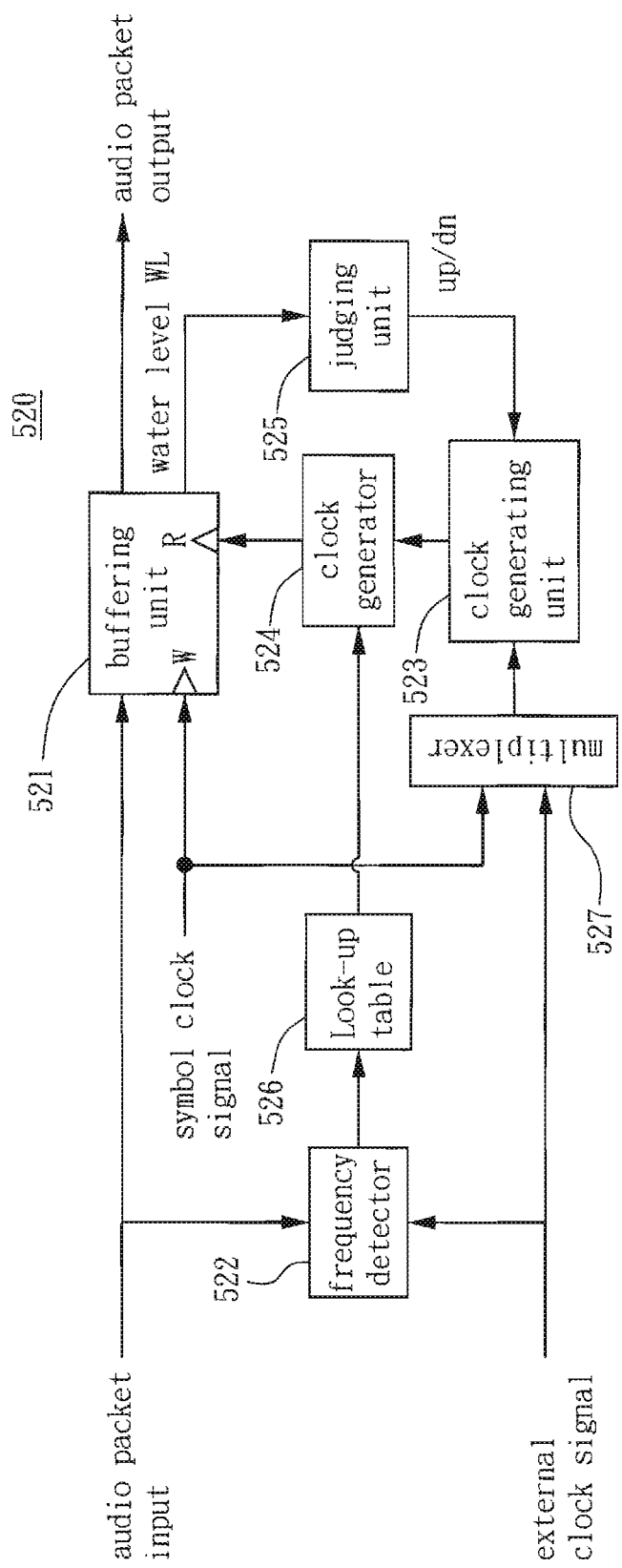
FIG. 5 relates to the signal receiving apparatus diagram according to the present invention.

FIG. 5 illustrates another embodiment of the present invention, which discloses a signal receiving apparatus 520 implemented by Application Specified Integrated Circuit (ASIC)/Hardware, said apparatus 520 comprises: a buffering unit 521, a frequency detector 522, a clock generating unit 523, a clock generator 524, and a judging unit 525.

Wherein, the buffering unit 521 can be a first-in, first-out (FIFO) memory, and might be a audio buffering unit for receiving a plurality of data according to a symbol clock signal, and reading out the plurality of data in packet format and generating a water level according to a first clock signal, wherein the water level is a data flow or data amount stored in the buffering unit 521. Meanwhile, when the plurality of data stored in the buffering unit 521 is being sending out in sequence, the a first clock signal is being used to read out the plurality of data, and when the symbol clock signal and the first clock signal are synchronous, the average input data amount and the average output data amount of the buffering unit 521 will be identical. In the present embodiment, the clock generating unit 523 is for receiving a control signal and a second clock signal up/dn so as to generate a third clock signal; while the frequency detector 522 received a frequency appeared to be the relatively large value of the audio sampling frequencies such as 176.4 kHz or 192 kHz, the third clock signal is the first clock signal and makes the average data amount per unit time period inputting/outputting the buffering unit 521 neither exceed the capacity of the 521 nor leak the same to be zero or close to zero.

In other words, the frequency detector 522 using the larger value of the audio sampling frequencies as a default, such as 176.4 kHz or 192 kHz, the first clock signal and the third clock signal are approximately equal to the symbol clock signal so as to ensure the average data amount in/out the buffering unit 521 to be roughly identical. The clock generating unit 523 might be a phase-locked loop (PLL) or a direct digital synthesis device (DDSD), and their parameter are set according to the larger value of the audio sampling frequency such as 176.4 kHz or 192 kHz, and the parameter are chosen to be the default value so as to ensure the average data amount in/out the buffering unit 521 to be identical.

Figures 5A, 5B:
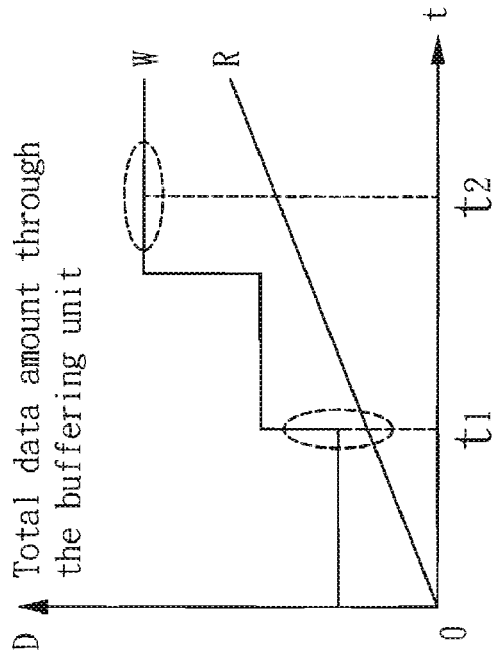
FIG. 5A relates to the look-up table used in the signal receiving apparatus according to the present invention.
FIG. 5B relates to the read-out/write-in amount (or flow) of the temporarily stored data in the buffering unit for the signal receiving apparatus according to the present invention.

And when the frequency detector 522 detects the effective data amount during a unit time period is decrease, such as decreasing from 192 kHz to 48 kHz, the person who skilled in the art can also dispose a look-up table 526 (one embodiment of the look-up table 526 is illustrated well in FIG. 5A), for dividing the third clock signal by 4 via the clock generator 524, such as a dividing means, so as to increase the locking speed of the clock generator 523. The input clock of the clock generating unit 523, namely, the second clock signal can be selected from the symbol clock signal or an external clock signal by a multiplexer 527. Without the aforesaid dividing means or look-up table, the present embodiment is still operable but suffering from the bigger size of the buffering unit 521 and longer locking time. Meanwhile, in HDMI or DisplayPort, said look-up table can also determined by N and CTS of the HDMI packet, or $M_{aud}$ and $N_{aud}$ of the DisplayPort packet, so as to achieve the goal of reducing the dividing values in the dividing means and the number needed for the dividing means, hereby the duplicate description will be omitted.

A frequency doubler can also serve as the clock generator 524, for example, when the unit time period of the apparatus 520 for receiving a plurality of data according to a symbol clock signal is increasing, like increasing from 48 kHz to 192 kHz, the clock generator 524 at the time multiplies the third clock signal by 4 (because 192 kHz divided by 48 kHz has a closest integer 4) so as to increase the locking speed of the clock generator 523.

The option to use the frequency doubler or the dividing means for the 524 depends on the default values. For example, if the frequency detector 522 has an audio sampling frequency at larger values, such as 176.4 kHz or 192 kHz as default values, then the dividing means is chosen. Correspondingly, if the frequency detector 522 has an audio sampling frequency at smaller values, such as 32 kHz, 44.1 kHz, or 48 kHz as default values, then the frequency doubler is chosen. Meanwhile, if the middle values such as 88.2 kHz or 96 kHz are chosen as default values, then the clock generator 524 simultaneously comprises a frequency doubler and a dividing means.

The look-up table disclosed in the present invention provides a specific value for the frequency doubler or the dividing means, and the skilled artisan familiar with the same can vary its application, thus the redundant information will be omitted.

If there is any jitters at the output side of the clock generating unit 523, or if there is other causes for the symbol clock signal offsets thus differs from the first clock signal, at the input/output side of the buffering unit 521 there will be variation for the average data amount per unit time so as to descending or ascending water level WL. As shown in FIG. 5B, the buffering unit 521 can also base upon the temporarily stored data flow or amount, subtract the write-in data amount W from the read-out data amount R so as to generate a water level WL. For example, the buffering unit 521 can obtain the water level WL according to the difference between a write-in address of the plurality of data and a read-out address of the plurality of data.

The judging unit 525 generates a control signal up/dn according to the water level WL so as to control the speed of the third clock signal generated by the clock generating unit 523. When the temporarily stored amount (WL) of the buffering unit 521 is "full" or "close to full", as the time $t_2$ suggested in FIG. 5B, the control signal up is used to control the clock generating unit 523 to speed up the third clock signal; when the temporarily stored amount (WL) of the buffering unit 521 is "empty" or "close to empty", as the time $t_1$ suggested in FIG. 5B, the control signal do is used to control the clock generating unit 523 to slow down the third clock signal. The clock generating unit 523 is for receiving the symbol clock signal or the external clock signal to generate the aforesaid third clock signal and adjust the third clock signal according to the control signal up/dn and further influence the water level for the buffering unit 521.

Figure 6:
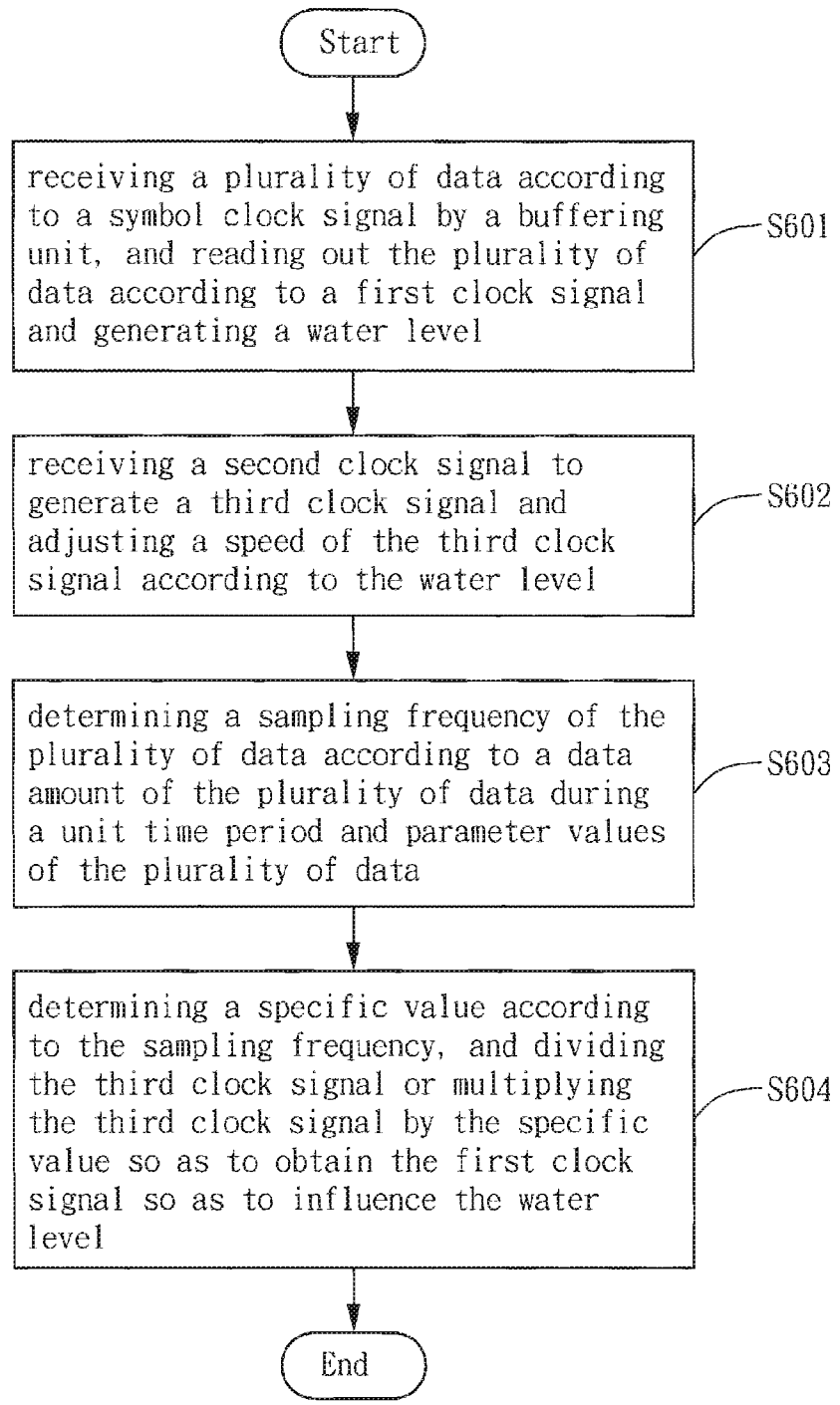
FIG. 6 relates to a flow chart of the method for receiving a signal according to the present invention.

FIG. 6 illustrates a method for receiving a clock signal, comprises the steps of: s601: receiving a plurality of data according to a symbol clock signal by a buffering unit, and reading out the plurality of data according to a first clock signal and generating a water level;

s602: receiving a second clock signal to generate a third clock signal and adjusting a speed of the third clock signal according to the water level;

s603: determining a sampling frequency of the plurality of data according to a data amount of the plurality of data during a unit time period and parameter values of the plurality of data; and s604: determining a specific value according to the sampling frequency, and dividing the third clock signal or multiplying the third clock signal by the specific value so as to obtain the first clock signal so as to influence the water level.

The method illustrated in FIG. 6 is applicable to a DisplayPort, HDMI, USB, and 1394 related circuit, where the dividing value and the sampling frequency can be further obtained by checking the look-up table, meanwhile, the sampling frequency can be further chosen from the group consisting of 32 kHz, 44.1 kHz, 48 kHz, 88.2 kHz, 96 kHz, 176.4 kHz and 192 kHz, and the data is in the form of a audio data packet.

The method illustrated in FIG. 6 further comprises the characteristics as follows:

(1) The corresponding specific value is determined according to the integral value close to the result of 176.4 kHz or 192 kHz divided by the sampling frequency, or, is determined according to the integral value close to the result of the sampling frequency divided by 32 kHz, 44.1 kHz, or 48 kHz;

(2) the WL/water level is determined according to the difference between a write-in address of the plurality of data and a read-out address of the plurality of data;

(3) the third clock signal is generated according to the default of the larger sampling frequency such as 192 kHz or 176.4 kHz, and the second clock signal is selected from either the symbol clock signal or an external clock signal; and (4) according to the specification of DisplayPort, HDMI, USB, or 1394, the effective values of the plurality of data can be obtained, and divided the summation of the effective values of the plurality of data by the unit time period so as to obtain the sampling frequency.

The invention being thus aforesaid, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An apparatus for receiving a signal, comprising:
a buffering unit, receiving a plurality of data according to a symbol clock signal, reading out the plurality of data according to a first clock signal and generating a water level, wherein the water level is a data amount temporarily stored in the buffering unit;
a clock generating unit, receiving a control signal and a second clock signal to generate a third clock signal;
a judging unit, receiving the water level and generating the control signal according to the water level, so as to control a generating speed of the third sampling clock signal of the clock generating unit;
a frequency detector, determining a sampling frequency of the plurality of data according to a data amount of the plurality of data during a unit time period or parameter values of the plurality of data; and
a clock generator, dividing the third clock signal by a dividing value or multiplying the third clock signal by a multiplying value, so as to obtain the first clock signal and to influence the water level.

2. The apparatus according to claim 1, is applicable to the circuit complying with the specification of DisplayPort, HDMI, USB or IEEE 1394.

3. The apparatus according to claim 1, further comprises a look-up table, coupled between the frequency detector and the clock generator, and the look-up table further having a plurality of sampling frequencies and corresponding multiplying values or dividing values.

4. The apparatus according to claim 3, wherein the plurality of sampling frequencies in the look-up table comprises 32 kHz, 44.1 kHz, 48 kHz, 88.2 kHz, 96 kHz, 176.4 kHz and 192 kHz.

5. The apparatus according to claim 3, wherein the dividing value corresponding to one of the plurality of sampling frequencies is an integer value close to a result of a larger frequency in the look-up table divided by the sampling frequency determined from the frequency detector, and the multiplying value is an integer value close to a result of the sampling frequency determined from the frequency detector divided by a smaller frequency in the look-up table, wherein the larger frequency might be 176.4 kHz or 192 kHz, and the smaller frequency might be 32 kHz. look-up.

6. The apparatus according to claim 1, wherein the buffering unit is an audio buffering unit.

7. The apparatus according to claim 1, wherein the buffering unit generates the water level according to a difference between a write-in address of the plurality of data and a read-out address of the plurality of data.

8. The apparatus according to claim 1, wherein the clock generator comprises a dividing means and a frequency doubler.

9. The apparatus according to claim 3, wherein the clock generating unit setting the larger values of the look-up table such as 176.4 kHz or 192 kHz as a default so as to generate the third clock signal.

10. The apparatus according to claim 1, wherein the clock generating unit is a phase-locked loop.

11. The apparatus according to claim 1, wherein the clock generating unit is a direct digital synthesis device.

12. The apparatus according to claim 1, wherein the second clock signal is selected from the symbol clock signal or an external clock signal.

13. The apparatus according to claim 1, wherein the buffering unit is a first-in, first-out memory.

14. The apparatus according to claim 1, wherein the frequency detector obtains an effective value of the data amount of the plurality of data according to DisplayPort, HDMI, USB, or 1394 standard, and divides a summation of the effective values by the unit time period to generate the sampling frequency.

15. The apparatus according to claim 1, wherein the plurality of data are in packet format.

16. The apparatus according to claim 1, wherein the apparatus is Application Specified Integrated Circuit.

17. A method for receiving a clock signal, comprises steps of:
receiving a plurality of data according to a symbol clock signal by a buffering unit, and reading out the plurality of data according to a first clock signal and generating a water level;

receiving a second clock signal so as to generate a third clock signal and regulating a speed of the third clock signal according to the water level;

determining a sampling frequency of the plurality of data according to a data amount of the plurality of data during a unit time period or parameter values of the plurality of data; and determining a specific value according to the sampling frequency, and dividing the third clock signal or multiplying the third clock signal by the specific value so as to obtain the first clock signal so as to influence the water level.

18. The method according to claim 17, is applied to a circuit complying with DisplayPort, HDMI, USB, or IEEE 1394.

19. The method according to claim 17, wherein the sampling frequency and the specific value is obtained from a look-up table.

20. The method according to claim 17, wherein the sampling frequency is selected from 32 kHz, 44.1 kHz, 48 kHz, 88.2 kHz, 96 kHz, 176.4 kHz and 192 kHz.

21. The method according to claim 17, wherein the plurality of data is audio data.

22. The method according to claim 17, wherein the corresponding specific value is determined according to an integral value close to a result of 176.4 kHz or 192 kHz divided by the sampling frequency, or, is determined according to an integral value close to a result of the sampling frequency divided by 32 kHz or 44.1 kHz or 48 kHz.

23. The method according to claim 17, wherein the steps of generating the water level further comprises generating the water level according to a difference between a write-in address of the plurality of data and a read-out address of the plurality of data.

24. The method according to claim 17, further comprising: generating a control signal according to the water level; and
adjusting the speed of the third clock signal according to the control signal.

25. The method according to claim 17, further comprising: setting the larger sampling frequency as a default so as to generate the third clock signal.

26. The method according to claim 17, further comprising: the second clock signal is selected from the symbol clock signal or an external clock signal.

27. The method according to claim 17, wherein the plurality of data are in packet format.

28. The method according to claim 17, wherein the buffering unit is a first-in first-out memory.

29. The method according to claim 17, further comprising: obtaining an effective value of the data amount of the plurality of data according to DisplayPort, HDMI, USB, or 1394 standard, and divides a summation of the effective values by the unit time period to generate the sampling frequency.

* * * * *